Figure 1:
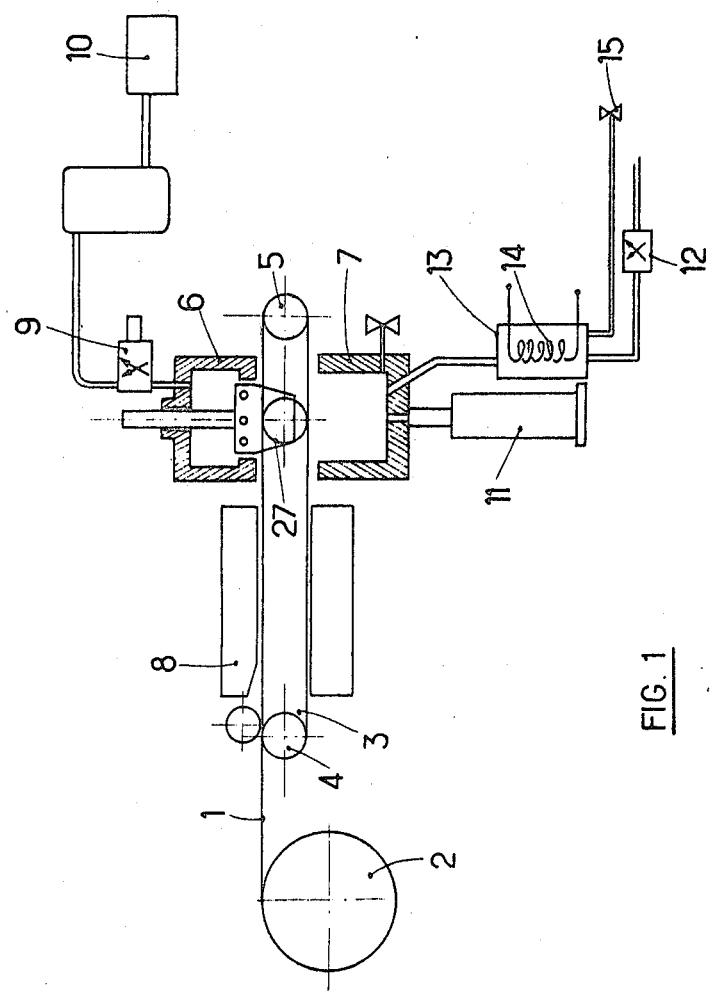

United States Patent

Palencher

[15] 3,642,409

[45] Feb. 15, 1972

[54] APPARATUS FOR MAKING MOLDED OBJECTS

[72] Inventor: Jacques Palencher, Troyes, France
[73] Assignee: Labocey Industrie, Troyes, France
[22] Filed: Aug. 20, 1969
[21] Appl. No.: 851,546

[30] Foreign Application Priority Data

Oct. 29, 1968 France..................................171709

[52] U.S. Cl.............................425/305, 425/398, 425/422
[51] Int. Cl.........................................B29c 3/00, B29c 17/03
[58] Field of Search.................18/19 R, 19 BM, 19 F, 19 H, 18/16 R, 35, 19 P, DIG. 35, DIG. 39, 16–16.7

[56] References Cited

UNITED STATES PATENTS

| | | | |
|---|---|---|---|
| 2,190,807 | 2/1940 | Steinberger | 18/19 P |
| 3,218,379 | 11/1965 | Edwards | 18/19 F X |
| 3,284,553 | 11/1966 | Edwards | 18/19 F X |
| 3,400,111 | 9/1968 | Schwartz | 18/19 F |
| 3,527,854 | 9/1970 | Martin et al. | 18/19 F X |

*Primary Examiner*—Robert L. Spicer, Jr.
*Attorney*—McNenny, Farrington, Pearne and Gordon

[57] ABSTRACT

The invention relates to a process and device for making eventually expanded objects of synthetic material in which the material for molding is kept at a temperature for facilitating molding and accentuating the increase of volume of the synthetic material when it is expanded.

4 Claims, 2 Drawing Figures

APPARATUS FOR MAKING MOLDED OBJECTS

Process are already known for making receptacles of synthetic material by heat shaping.

In these known processes, the strip to be shaped is generally passed between heating means before being conveyed to the heat-shaping station.

However, it is then noticed that the material forming the strip rapidly cools during the conveying of the heating strip to the conversion tool, which results in a greater difficulty in transforming, and a poorer quality of the heat-shaped article.

These disadvantages are particularly apparent when in the case of objects requiring to be made of expanded synthetic material, for which the expansion is a function of heat.

The present invention specifically has the purpose of obviating these disadvantages and relates, to this end, to a process for making molded articles of synthetic material, and specifically of expanded synthetic material, characterized in that hot air is introduced into the molding enclosure at least during this molding operation, enabling the material for molding to be kept at an even temperature, so as to facilitate this molding operation and eventually to accentuate the ability of the material to increase in volume in the case of an expanded synthetic material.

According to another characteristic of the invention, the air introduced contains dry steam or moist steam.

The invention also relates to a device for operating the present or a similar process.

According to another characteristic of the invention, means are provided for exerting a controlled pressure on the cut out part of the material strip, this pressure being such that it allows of drawing of the material during shaping.

The invention also relates to molded objects obtained by this or a similar process.

Figure 2:
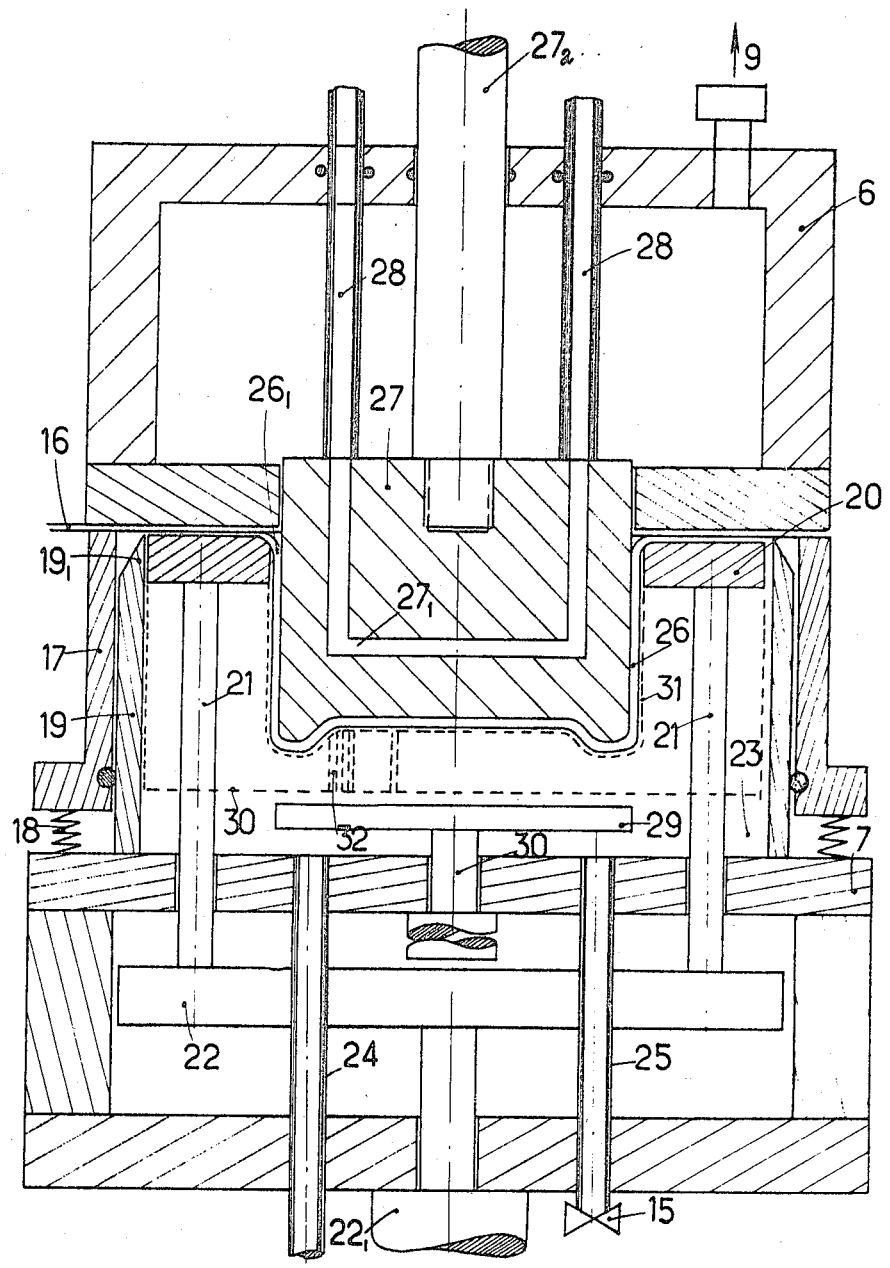

The invention also applies to the characteristics arising out of the text of the description, claims and attached drawings, in which:

FIG. 1 shows, in a partially cutaway diagrammatical manner, an installation according to the invention, FIG. 2 is a sectional view of a molding station according to the invention.

Consequently, the present invention has the object of facilitating molding operations and specifically heat shaping, as well as to improve the quality of molded articles, these articles being eventually made of expanded plastic material.

The molding unit shown in FIG. 1 comprises a heat-shaping station enclosure which is fed by a strip of plastic material 1 for working upon, coming from a roller 2. This strip is conveyed by an endless belt 3 mounted on rollers 4 and 5 to the heat-shaping station enclosure comprising a fixed member 6 and a movable member 7.

While the strip 1 is being conveyed from the roller 2 to the shaping station, the strip is heated by heating means 8.

In the case of heat shaping on an expanded plastic material, there thus occurs, as from this manufacturing stage, a commencement of expansion of the material.

When a zone of the strip 1 is brought to the shaping station, the movable member 7 holds the strip against the member 6 and the shaping punch 27 is lowered, so as to shape the strip of material 1.

The displacing of the movable member 7 and punch 27 is obtained by means of jacks, such as 11.

Generally speaking, during this operation, a vacuum is set up inside the member 6 by means of a control valve 9 and from a vacuum source 10, while a pressure is established in the movable part.

However, according to the invention, means are provided for facilitating the shaping operation and increasing the quality of the shaped article.

Moreover, these means have the purpose of favorizing the expanding of the material in a case where it is an expanded synthetic material. These means consist of introducing hot air into the member 7 containing the heat-shaped article; preferably, this air will contain moist or dry steam, in order to ensure proper action of the heat contained in the steam on the plastic material.

This heat will thus facilitate the molding operation and increase the quality of the molded article, but in the case of expanded plastic material, it will have the particular effect, during shaping, of completing the expansion of the material which has already partially occurred under the action of the heat given off by the heating means 8.

This air is conveyed to the inside of the member 7 by means of a valve 12 and a heat enclosure 13, which, for instance, contains a heating resistance 14.

Water may also be conveyed into the enclosure 13 by means of a valve 15, this water being immediately converted into steam by the heating resistances 14.

In FIG. 2, which shows a shaping enclosure in more detail according to the invention, there will also be seen the movable member 7 and the fixed part 6 in whose interior the punch 27 moves operated by the rod $27_2$.

When the movable member 7 comes close to the fixed member 6, the plate of plastic material that is to be dealt with 16 is held by a retaining ring 17 pushed by springs 18.

When this approach takes place, a sleeve 19, whose top end $19_1$ is sharp, cuts the strip 16, so as to cut off a part for heat shaping.

After this cutting, a member 20 thrust by rods 21 fixed to a base 22 and controlled by a jackrod $22_1$ seizes the edges of the cutoff part of the strip. However, the pressure exerted by the part 20 on the cutoff part of the strip being such that it enables the sliding of this cutoff part to be checked when shaping takes place.

The various members being thus positioned, a vacuum is produced inside the enclosure 6 and the hot air containing steam is conveyed to the interior of the enclosure 23 confined by the sleeve 19.

This hot steam atmosphere is achieved, for instance, by introducing a hot gas, air, for example, through the duct 24 and water through the duct 25, then, a jack acts on the rod $27_2$ for moving the punch 27 and effecting the shaping of the cutout part 27 of the strip.

A hot water circulation can also be arranged inside punch 27 by means of piping $27_1$ fed by ducts 28.

When the punch penetrates into the previously separated zone 26 of the strip 16, the edges of this zone $26_1$ flow along the inner edges of the part 20 owing to the controlled pressure exerted by this part 20.

After shaping, the member 7 lowers, whereas the punch rises.

During this operation, the ring 17 tends, owing to the springs 18, to hold the strip 16 for a short moment against the member 6, so as to remove the strip from the knife $19_1$ which could have jammed on the cut edge of this strip.

For ejecting the molded article, a plate 29 is provided operated by means of a rod 30, from a jack, so as to move the molded article upwards.

However, it will be noticed that in the machine shown in this FIG. 2, this part 20 can form in itself a shaping die, and in this case it will, for instance, follow the outline schematized by the dotted lines 30.

In the case of shaping an article by means of expanded plastic material, the internal contour 31 of this die will be placed at a certain distance from the part of the shaped strip 26, so as to allow it freely to expand. In this case, ducts 32 will be provided in this die, to allow the passage of steam favorizing the expansion of the material used.

Of course, the invention is not restricted to the example of embodiment described and shown above, from which other methods and forms of embodiment can be provided, without going outside of the scope of the invention for that purpose.

What I claim is:

1. A molding apparatus comprising in combination:
   a. a heat-shaping station enclosure having first and second members, at least one of which is movable and adapted to press between confronting portions thereof a strip of material to be heat shaped;
   b. a movable heat-shaping punch mounted in the first member of said station enclosure and extensible into the second member of said station enclosure;

c. said second member including a retaining ring having upper and lower edges and being resiliently carried on spring means coacting between said retaining ring and said second member for resilient engagement with the strip of material to be heat shaped; and d. a sleeve telescopically mounted interiorly of said retaining ring including a cutting edge for cutting the strip of material to be heat shaped, said cutting edge being located at a level between the high and the low position of the upper edge of said retaining ring when the spring means are respectively compressed and uncompressed.

2. An apparatus in accordance with claim 1 additionally including means telescopically mounted within the sleeve for exerting a controlled pressure on the cutout portion of the strip of material.

3. An apparatus in accordance with claim 1 additionally including means for introducing hot air into the second member of the heat-shaping station enclosure and means in the first part of the heat-shaping station enclosure for forming a depression in the strip of material to be heat shaped.

4. An apparatus in accordance with claim 1 additionally including means for ejecting a heat-shaped article from said apparatus.

* * * * *